United States Patent Office 3,144,477
Patented Aug. 11, 1964

3,144,477
2-BUTENEHEXACARBONITRILES AND PROCESS FOR THE PREPARATION THEREOF
Elmore L. Martin, Wilmington, Del., assignor to E. I. du Pont de Nemours and Company, Wilmington, Del., a corporation of Delaware
No Drawing. Filed Mar. 20, 1962, Ser. No. 181,205
11 Claims. (Cl. 260—465)

This invention relates to a new class of cyano-containing organic compounds and a process for their preparation. More particularly, it concerns 1,4-disubstituted 2-butenehexacarbonitriles and their preparation.

The discovery of tetracyanoethylene proved to be a great stimulus to the study of cyano-containing compounds because of the unexpected chemical activity it was found to possess. The large number of new compounds derived directly from tetracyanoethylene by reaction with common chemical compounds opened the whole field of cyanocarbon chemistry and made it desirable to search for other cyano-containing compounds not directly derived from tetracyanoethylene.

There have now been synthesized 1,4-disubstituted 2-butenehexacarbonitriles in which each of the two indicated substituents is a monovalent organic radical with its bond to the butenehexacarbonitrile nucleus stemming from a carbon atom. This generic structure defines completely a unique class of compounds, all of which yield strong organic acids on heating. The invention also embraces a process for preparing these 1,4-disubstituted 2-butenehexacarbonitriles by the reaction of an alkali or alkaline earth metal derivative of the corresponding monosubstituted malononitrile with a 1,2-dihalo-1,2-dicyanoethylene.

The 1,4-disubstituted 2-butenehexacarbonitriles may be represented by the formula

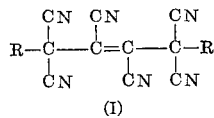

(I)

where the R's may be alike or different and may be any monovalent organic radical with its bond to the nucleus stemming from a carbon atom.

The process of this invention may be illustrated by the equation

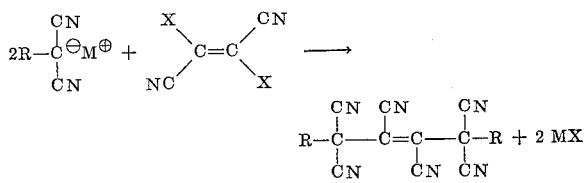

in which M is an alkali metal, i.e., Li, Na, K, Rb, or Cs, or an alkaline earth metal, i.e., Mg, Ca, Sr, or Ba; X is halogen, particularly chlorine, bromine, or iodine; and R is as defined above. The 1,2-dihalo-1,2-dicyanoethylene may be a dihalofumaronitrile as indicated or the corresponding dihalomaleonitrile.

The process may be carried out by simply bringing into intimate contact the selected metal derivative of a monosubstituted malononitrile and the selected 1,2-dihalo-1,2-dicyanoethylene within the temperature range of −100° C. to +100° C., although the preferred range for obtaining highest yields of products is −80° C. to 0° C. No additives or reaction media are essential. If both of the reactants are solids, intimate contact may be obtained by grinding, as in impact grinding. However, to provide for more adequate temperature control, it is preferred to carry out the process in the presence of a liquid medium which is inert to the reactants and products. Suitable reaction media of this type are represented by tetrahydrofuran, diethyl ether, dimethylformamide, methanol, ethanol, and the like.

The proportions in which the reactants may be brought together to carry out the process of this invention are not critical and may be varied widely. Highest yields of the 1,4-disubstituted 2-butenehexacarbonitrile products are obtained when the molar ratio of the metal derivative of the monosubstituted malononitrile to the 1,2-dihalo-1,2-dicyanoethylene is substantially 2:1, and this represents the preferred proportion. However, ratios in the range from 10:1 to 1:5 are operable for obtaining at least some of the desired product.

A preferred group of the products of this invention are those of Formula I above in which the R's are hydrocarbyl or substituted hydrocarbyl in which the substituents are amino, hydrocarbyl-substituted amino, hydroxy, cyano, halo (particularly fluoro, chloro, bromo, and iodo), nitro, sulfo (salt), hydrocarbyloxysulfonyl, hydrocarbyloxy, or hydrocarbyloxycarbonyl.

"Hydrocarbyl" is used in its accepted meaning as representing a radical formed from a hydrocarbon by removal of a hydrogen atom. The hydrocarbyl groups represented by the R's in the formula above may be any radical composed solely of carbon and hydrogen. "Hydrocarbyl" is used in its full generic sense. The wide variation in the hydrocarbyl groups used in the illustrations which follow makes it evident that all hydrocarbyl groups are operable. Hydrocarbyl groups may vary as to whether they are alkyl, cycloalkyl, aryl, aralkyl, alkaryl, single ring, multi ring, aliphatically saturated, aliphatically unsaturated, straight chain, branched chain, large, small, and the like. The widest variation of this sort does not in any way detract from the fundamental characteristic of the hydrocarbyl radical of passing unchanged through the process of this invention and exercising no effect whatever on the chemical steps of the process. Representative hydrocarbyl groups include methyl, tert-butyl, isooctyl, dodecyl, octadecyl, eicosyl, vinyl, ethynyl, propargyl, 9,10-octadecenyl, 9,10-octadecynyl, butadienyl, 9,12-octadecadienyl, cyclopropyl, cyclobutyl, cyclohexyl, cyclooctyl, phenyl, naphthyl, anthryl, rubryl, benzyl, phenethyl, duryl, 4-isopropylnaphthyl, chrysyl, and the like.

The limitations of space for disclosure are not to be construed as any limitation within the scope of "hydrocarbyl" contemplated in this invention. Even the most cumbersome hydrocarbyl radicals such as those obtained by removing end groups from high molecular weight hydrocarbon polymer molecules containing thousands of carbon atoms, such as polyethylene, polyisobutylene, polystyrene, and the like, are fully operable.

It is obvious that hydrocarbyl groups containing 20 or fewer carbon atoms are most available, and to that extent preferred. But there is to be no question of the operability of, or of the intent to include and disclose, any hydrocarbyl group whatsoever.

In the above formulas, the groups particularly preferred for R, because of their ready availability through synthetic routes, include alkyl, including aliphatically mono- and polyunsaturated alkyl with up to and including 18 carbon atoms; cycloalkyl with three to ten carbon atoms (as in cyclopropyl, cyclohexyl, and camphyl); aralkyl with 7 to 19 carbon atoms (as in benzyl and triphenylmethyl); and aryl with up to and including 18 carbon atoms (as in phenyl, naphthyl, anthryl, furyl, thienyl, pyrrolyl, quinolyl, anthraquinolyl, dibenzofuryl, and benzanthryl), as well as substituted derivatives of these alkyl, cycloalkyl, aralkyl, and aryl groups carrying one or more substituents such as hydroxy, lower alkoxy, benzyloxy, aryloxy in which the aryl groups have up to 12 carbon atoms (as in phenyl, tolyl, naphthyl, and anthryl), lower alkyl, lower alkylsulfonyl, hydroxy lower alkylsulfonyl, benzylsulfonyl, arylsulfonyl in which the aryl groups have up to 12 carbon atoms (as in phenyl, tolyl, naphthyl, and anthryl), formyl, cyano, halogen (as in fluoro, chloro, bromo, and iodo), amino, dilower alkylamino, diphenylamino, dibenzylamino, acylamino in which the acyl groups contain up to seven carbon atoms (as in acetyl, butyroyl, and benzoyl), carboxy, lower alkoxycarbonyl, and nitro.

A particularly preferred group among the products of this invention are those in which R is essentially an ethyl or larger group of the formula

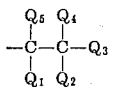

where the Q's may be hydrogen, hydrocarbyl, or substituted hydrocarbyl as defined in R above and at least one but no more than four of the Q's are hydrogen. These compounds are all proto acids (i.e., acid precursors) which, on heating, yield strong organic acids. In this process, one of the R groups is removed, yielding the corresponding free-acid form of a 4-substituted hexacyano-2-butene and an olefin. For example, when $Q_2$ is hydrogen, the process and products of this conversion may be represented by the equation:

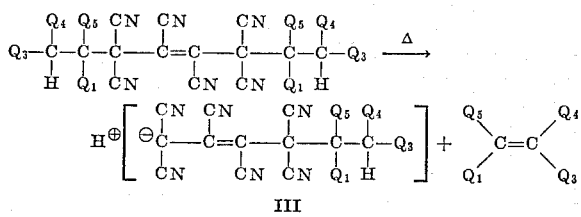

The 1,4-disubstituted 2-butenehexacarbonitriles of this invention which do not fit Formula II above also yield acids on heating. Thus when the R's in Formula I are such that (a) there is no carbon atom in R bonded to the carbon which is the site of attachment of R or if (b) neither of the first two directly connected carbon atoms in R (starting from the point of attachment) carries a hydrogen atom, heating of the molecule causes scission of the 2-butene. The resulting free radical reacts with water (traces of water in the air are adequate) to yield an acid. This may be illustrated as follows, if R' represents an organic radical which satisfies conditions (a) or (b) above:

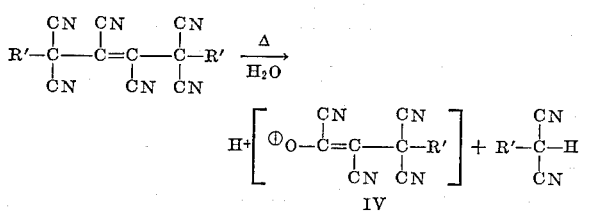

Many of the monosubstituted malononitriles used as starting materials in the process of this invention are synthesized from aldehydes, ketones, and halides by methods known in the art. Any known aldehyde or ketone may be employed. Since substantially all organic radicals are available as moieties of known aldehydes and ketones and since further modifications may be readily introduced in the Grignard synthesis of monosubstituted malononitriles, as illustrated in Syntheses B, C, and D discussed below any known organic radical may be obtained as a substituent in a 1,4-disubstituted 2-butenehexacarbonitrile. The required monosubstituted malononitrile is prepared by known synthetic routes and employed in the process of this invention to yield the desired 1,4-disubstituted 2-butenehexacarbonitrile. These may be illustrated as follows:

*Synthesis A.*—The selected aldehyde or ketone is condensed with malononitrile in the presence of β-alanine and acetic acid or in the presence of piperidine to yield the corresponding alkylidenemalononitrile. The alkylidenemalononitrile is subjected to catalytic hydrogenation, for example using palladium-on-carbon catalyst, to yield the desired substituted malononitrile.

*Synthesis B.*—An alkylidenemalononitrile is synthesized as described in Synthesis A. This is then treated with methylmagnesium bromide to yield the corresponding α-methyl monosubstituted malononitrile.

*Synthesis C.*—Phenylmagnesium bromide is used in place of methylmagnesium bromide in Synthesis B to obtain the corresponding α-phenyl monosubstituted malononitrile.

*Synthesis D.*—Benzylmagnesium bromide is used in place of methylmagnesium bromide in Synthesis B. to obtain the corresponding α-benzyl monosubstituted malononitrile.

*Synthesis E.*—The selected halide is treated with potassium cyanide to yield the corresponding nitrile. This nitrile is treated with ethyl carbonate in the presence of sodium methylate to yield the corresponding substituted cyanoacetate. The cyanoacetate is converted to the corresponding cyanoamide by the action of ammonia and the cyanoamide is converted to the corresponding substituted malononitrile by the action of phosphorus oxychloride.

The substituted malononitriles indicated in Table I are employed in the examples below and are synthesized from the indicated starting materials by the methods noted.

TABLE I

| Aldehyde, ketone, or halide starting material | Synthesis method | Substituted malononitrile product |
|---|---|---|
| Benzaldehyde | A | Benzylmalononitrile. |
| Do | B | α-Methylbenzylmalononitrile. |
| Acetophenone | B | α,α-Dimethylbenzylmalononitrile. |
| Acetone | D | α,α-Dimethyl-β-phenylethylmalononitrile. |
| Benzaldehyde | C | α-Phenylbenzylmalononitrile. |
| p-Chlorobenzaldehyde | B | α-Methyl-p-chlorobenzylmalononitrile. |
| p-Dimethylaminobenzaldehyde | B | α-Methyl-p-dimethylaminobenzylmalononitrile. |
| p-Methoxybenzaldehyde | B | α-Methyl-p-methoxybenzylmalononitrile. |
| p-Methoxybenzaldehyde | C | α-Phenyl-p-methoxybenzylmalononitrile. |
| Acetone | A | Isopropylmalononitrile. |
| Do | B | t-Butylmalononitrile. |
| Benzaldehyde | D | α-Benzylbenzylmalononitrile. |
| Isobutyraldehyde | A | Isobutylmalononitrile. |
| Do | B | 1,2-dimethylpropylmalononitrile. |
| Cyclopentanone | A | Cylopentylmalononitrile. |
| Do | B | 1-methylcyclopentylmalononitrile. |
| Cyclohexanone | B | 1-methylcyclohexylmalononitrile. |
| β-Phenylacetaldehyde | A | β-phenylethylmalononitrile. |
| Methyl ethyl ketone | B | 1,1-dimethyl-n-propylmalononitrile. |
| Methyl isopropyl ketone | B | 1,1,2-trimethyl-n-propylmalononitrile. |
| Formaldehyde | A | Methylmalononitrile. |
| Furfuraldehyde | A | Furfurylmalononitrile. |
| Do | B | α-Methylfurfurylmalononitrile. |
| Cumaldehyde | A | p-Isopropylbenzylmalononitrile. |
| Do | B | α-Methyl-p-isopropylbenzylmalononitrile. |
| p-Isopropylbenzyl chloride | E | p-Isopropylphenylmalononitrile. |
| Benzyl chloride | E | Phenylmalononitrile. |
| p-Methoxycarbonylacetophenone | A | α-Methyl-p-methoxycarbonylbenzylmalononitrile. |
| p-Cyanoacetophenone | A | α-Methyl-p-cyanobenzylmalononitrile. |
| p-Methoxycarbonylbenzaldehyde | A | p-Methoxycarbonylbenzylmalononitrile. |

The examples which follow further illustrate but do not limit this invention.

Example I 1,4-DIPHENYL-2-BUTENE-1,1,2,3,4,4-HEXACARBO-
NITRILE

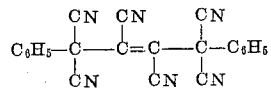

To a mechanically stirred suspension of 12 parts of sodium hydride in 444 parts of tetrahydrofuran is added slowly a solution of 71 parts of phenylmalononitrile in 444 parts of tetrahydrofuran. The temperature is maintained at 5–7° C. by means of external cooling and the reaction is carried out under an atmosphere of nitrogen. A solution of 74 parts of dichlorofumaronitrile in 222 parts of tetrahydrofuran is added slowly to the resulting solution of the sodium derivative of phenylmalononitrile at 5–7° C. After warming to 25° C., the tetrahydrofuran is removed by distillation under reduced pressure. The residue is collected and washed with cold water. The moist filter cake is dissolved in acetone and the 1,4-diphenyl-2-butene-1,1,2,3,4,4-hexacarbonitrile is precipitated by the addition of water. Two recrystallizations from acetone give 68 parts of the product in the form of colorless crystals, M.P. 228–230° C.

*Anal.*—Calcd. for $C_{22}H_{10}N_6$: C, 73.73; H, 2.81; N, 23.46. Found: C, 73.65; H, 3.01; N, 22.91.

Example II 1,6-DIPHENYL-3-HEXENE-2,2,3,4,5,5-HEXACARBO-
NITRILE

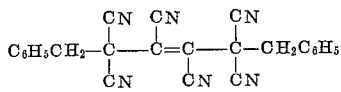

To a mechanically stirred suspension of 45 parts of 53.2% sodium hydride in 444 parts of tetrahydrofuran is added slowly a solution of 156 parts of benzylmalononitrile in 888 parts of tetrahydrofuran at 0° C. under an atmosphere of nitrogen. A completely homogeneous solution of sodium benzylmalononitrile is obtained within a few minutes after the addition is complete. The resulting solution is cooled to —20° C. and a solution of 74 parts of dichlorofumaronitrile in 222 parts of tetrahydrofuran is added slowly. The reaction mixture is allowed to warm to room temperature and the tetrahydrofuran is removed by distillation under vacuum at 20–25° C. The residue is washed with water, methanol, and ether. The resulting nearly colorless filter cake is dissolved in about 4750 parts of acetone. This solution is heated with activated carbon, filtered, and about 30,000 parts of warm water is added slowly to the filtrate. The colorless precipitate of 1,6-diphenyl-3-hexene-2,2,3,4,5,5-hexacarbonitrile is collected and washed with water, methanol, and ether. The yield is 159 parts. Recrystallization from tetrahydrofuran/benzene gives colorless crystals melting at 217–219° C.

*Anal.*—Calcd. for $C_{24}H_{14}N_6$: C, 74.60; H, 3.65; N, 21.75. Found: C, 74.56; H, 3.65; N, 21.61.

Example III 2,7-DIPHENYL-4-OCTENE-3,3,4,5,6,6-HEXACARBO-
NITRILE

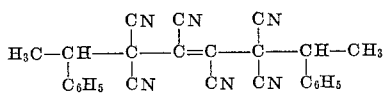

To a mixture of 72 parts of sodium hydride in 1776 parts of tetrahydrofuran 510 parts of α-methylbenzylmalononitrile is added slowly to obtain a solution of sodium α-methylbenzylmalononitrile. This solution is added slowly to a stirred solution of 233 parts of dichlorofumaronitrile in 1776 parts of tetrahydrofuran cooled to —60° C. The thick reaction mixture is allowed to warm to room temperature, and the tetrahydrofuran is removed by distillation under vacuum. The residue is washed with water, methanol, acetone, and ether. There is obtained 325 parts of 2,7-diphenyl-4-octene-3,3,4,5,6,6-hexacarbonitrile in the form of colorless crystals. The material is recrystallized three times by dissolving in acetone and precipitating by the slow addition of water to obtain crystals melting at 148–149° C.

*Anal.*—Calcd. for $C_{26}H_{18}N_6$: C, 75.34; H, 4.38; N, 20.28. Found: C, 75.30; H, 4.48; N, 20.15.

Example IV 2,7-DIMETHYL-2,7-DIPHENYL-4-OCTENE-3,3,4,5,6,6-
HEXACARBONITRILE

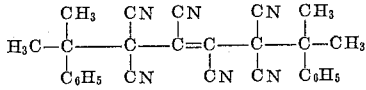

A solution of sodium α,α-dimethylbenzylmalononitrile is prepared in the manner of the first part of Example II using 72 parts of sodium hydride and 582 parts of α,α-dimethylbenzylmalononitrile in tetrahydrofuran. The resulting solution is added to a solution of 231 parts of dichlorofumaronitrile in 1776 parts of tetrahydrofuran at —60° C. to obtain a solution of 2,7-dimethyl-2,7-diphenyl-4-octene-3,3,4,5,6,6-hexacarbonitrile. The octene may be recovered from solution by evaporation at temperatures below —50° C.

Example V 2,7-DIBENZYL-2,7-DIMETHYL-4-OCTENE-3,3,4,5,6,6-
HEXACARBONITRILE

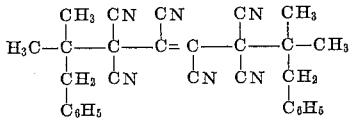

A solution of sodium α,α-dimethyl-β-phenylethylmalononitrile is prepared in the manner of the first part of Example II using 24 parts of sodium hydride and 192 parts of α,α-dimethyl-β-phenylethylmalononitrile in tetrahydrofuran at 0° C. The resulting solution is added slowly to a solution of 73 parts of dichlorofumaronitrile in 444 parts of tetrahydrofuran at —40° C. The resulting deep red reaction mixture is warmed to room temperature, and most of the tetrahydrofuran is removed by distillation under vacuum at 25° C. The residue is washed in turn with water, methanol, acetone, and ether. There is obtained 188 parts of 2,7-dibenzyl-2,7-dimethyl-4-octene-3,3,4,5,6,6-hexacarbonitrile in the form of a colorless powder melting at 157–158° C. A 10-part sample is purified by dissolving in 5940 parts of acetone. The resulting solution is filtered and 15,000 parts of water is added slowly to the filtrate. The colorless crystals which form are washed with water, methanol, and ether to yield 8 parts of crystalline product melting at 157–158° C.

*Anal.*—Calcd for $C_{30}H_{26}N_6$: C, 76.57; H, 5.57; N, 17.85. Found: C, 76.36; H, 5.89; N, 17.45.

Example VI 1,1,6,6-TETRAPHENYL-3-HEXENE-2,2,3,4,5,5-
HEXACARBONITRILE

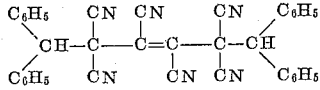

A solution of sodium α-phenylbenzylmalononitrile is prepared in the manner of the first part of Example II using 24 parts of sodium hydride, 232 parts of α-phenylbenzylmalononitrile, and 1776 parts of tetrahydrofuran. This solution is added slowly to a solution of 75 parts of dichlorofumaronitrile in 444 parts of tetrahydrofuran at —70° C. to obtain a solution of 1,1,6,6-tetraphenyl-3-hexene-2,2,3,4,5,5-hexacarbonitrile. The hexene may be recovered from solution by evaporation at temperatures below —50° C.

Example VII 2,7-BIS(p-CHLOROPHENYL)-4-OCTENE-3,3,4,5,6,6-HEXACARBONITRILE

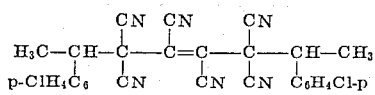

A solution of sodium α-methyl-p-chlorobenzylmalononitrile is prepared in the manner of the first part of Example II using 24 parts of sodium hydride, 210 parts of α-methyl-p-chlorobenzylmalononitrile, and 1776 parts of tetrahydrofuran. The resulting solution is added slowly to a solution of 75 parts of dichlorofumaronitrile in 444 parts of tetrahydrofuran at −70° C. The thick reaction mixture is allowed to warm to 0° C., and part of the tetrahydrofuran is removed by distillation under vacuum at that temperature. The residue is diluted with about 10,000 parts of ice water, and the resulting solid is collected by filtration and washed with ice water and petroleum ether. The filter cake is dissolved in 11,880 parts of acetone, and the resulting solution is treated with activated carbon and filtered. About 60,000 parts of water is added slowly to the filtrate. The precipitate which forms is collected by filtration, washed in turn with water, methanol, and petroleum ether, and dried to yield 170 parts of nearly colorless 2,7-bis(p-chlorophenyl)-4-octene-3,3,4,5,6,6-hexacarbonitrile. A 20-part sample is recrystallized five times from acetone/water to give colorless crystals melting at 156–157° C.

*Anal.*—Calcd. for $C_{26}H_{16}N_6Cl_2$: C, 64.60; H, 3.34; N, 17.39. Found: C, 64.43; H, 3.40; N, 17.25.

Example VIII 2,7-BIS(p-DIMETHYLAMINOPHENYL)-4-OCTENE-3,3,4,5,6,6-HEXACARBONITRILE

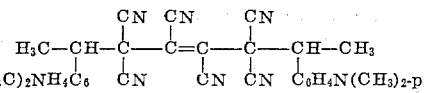

A solution of sodium α-methyl-p-dimethylaminobenzylmalononitrile is prepared in the manner of the first part of Example II using 24 parts of sodium hydride, 213 parts of α-methyl-p-dimethylaminobenzylmalononitrile, and 1776 parts of tetrahydrofuran. This solution is added slowly to a solution of 75 parts of dichlorofumaronitrile in 444 parts of tetrahydrofuran at −70° C. to obtain a solution of 2,7-bis(p-dimethylaminophenyl)-4-octene-3,3,4,5,6,6-hexacarbonitrile. The octene may be recovered from solution by evaporation of the tetrahydrofuran at temperatures below −50° C.

Example IX 2,7-BIS(p-METHOXYPHENYL)-4-OCTENE-3,3,4,5,6,6-HEXACARBONITRILE

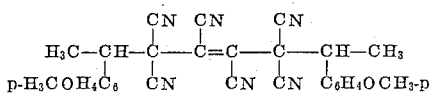

A solution of sodium α-methyl-p-methoxybenzylmalononitrile is prepared in the manner of the first part of Example II using 200 parts of α-methyl-p-methoxyphenylmalononitrile. This solution is added slowly to a solution of 75 parts of dichlorofumaronitrile in 444 parts of tetrahydrofuran at −70° C. to yield a solution of 2,7-bis(p-methoxyphenyl)-4-octene-3,3,4,5,6,6-hexacarbonitrile. The octene may be recovered from solution by evaporation of the tetrahydrofuran at temperatures below −50° C.

Example X 1,6-BIS(p-METHOXYPHENYL)-1,6-DIPHENYL-3-HEXENE-2,2,3,4,5,5-HEXACARBONITRILE

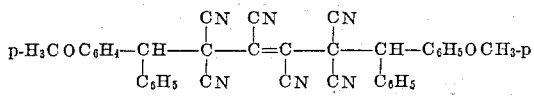

A solution of sodium p-methoxyphenylbenzylmalononitrile is prepared in the manner of the first part of Example II using 24 parts of sodium hydride, 262 parts of p-methoxyphenylbenzylmalononitrile, and 1332 parts of tetrahydrofuran. This solution is added slowly to a solution of 75 parts of dichlorofumaronitrile in 444 parts of tetrahydrofuran at −70° C. to obtain a solution of 1,6-bis(p-methoxyphenyl)-1,6-diphenyl-3-hexene-2,2,3,4,5,5-hexacarbonitrile. The 3-hexene may be recovered from solution by evaporating the tetrahydrofuran at a temperature below −50° C.

Example XI 2,7-DIMETHYL-4-OCTENE-3,3,4,5,6,6-HEXACARBONITRILE

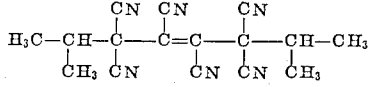

A solution of sodium isopropylmalononitrile is prepared in the manner of the first part of Example II using 72 parts of sodium hydride, 324 parts of isopropylmalononitrile, and 1776 parts of tetrahydrofuran. This solution is added slowly to a solution of 233 parts of dichlorofumaronitrile in 1776 parts of tetrahydrofuran at −70° C. The resulting thick mixture is allowed to warm to 20° C., and most of the tetrahydrofuran is removed by distillation under vacuum at that temperature. The residue is washed in turn with water, methanol, and ether. The colorless filter cake is dissolved in about 31,680 parts of acetone, treated with activated carbon, and filtered. To the filtrate is added slowly about 80,000 parts of warm water. The colorless precipitate which forms is collected by filtration, washed in turn with water, methanol, and ether and dried to yield 381 parts of 2.7-dimethyl-4-octene-3,3,4,5,6-hexacarbonitrile in the form of a colorless, crystalline powder melting at 264–265° C.

*Anal.*—Calcd. for $C_{26}H_{18}N_6$: C, 75.34; H, 4.38; N, 20.28. Found: C, 75.30; H, 4.48; N, 20.15.

Example XII 2,2,7,7-TETRAMETHYL-4-OCTENE-3,3,4,5,6,6-HEXACARBONITRILE

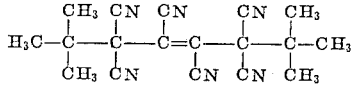

A solution of sodium tert-butylmalononitrile is prepared in the manner of the first part of Example II using 72 parts of sodium hydride, 366 parts of tert-butylmalononitrile, and 1776 parts of tetrahydrofuran. This solution is added slowly to a solution of 260 parts of dichlorofumaronitrile in 2220 parts of tetrahydrofuran at −70° C. The reaction mixture is warmed to 20° C., and most of the tetrahydrofuran is removed by disillation under vacuum at that temperature. The residue is washed in turn with water, methanol, and petroleum ether. The resulting nearly colorless powder weighs about 420 parts. Four recrystallizations from acetone/water give 2,2,7,7-tetramethyl-4-octene-3,3,4,5,6,6-hexacarbonitrile in the form of colorless crystals melting at 155–156° C.

*Anal.*—Calcd. for $C_{18}H_{18}N_6$: C, 67.90; H, 5.70; N, 26.40. Found: C, 68.01; H, 5.81; N, 26.13.

Example XIII 1,2,7,8-TETRAPHENYL-4-OCTENE-3,3,4,5,6-HEXACARBONITRILE

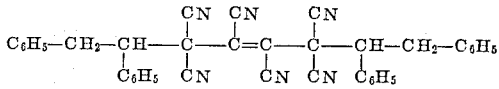

A solution of sodium α,β-diphenylethylmalononitrile is prepared in the manner of the first part of Example II using 24 parts of sodium hydride, 250 parts of α,β-diphenylethylmalononitrile, and 1332 parts of tetrahydrofuran. This solution is added slowly to a solution of 75 parts of dichlorofumaronitrile in 666 parts of tetrahydrofuran at —70° C. The thick reaction mixture is allowed to warm to room temperature and is diluted with ice water. The precipitate which forms is collected by filtration and washed in turn with water, methanol at —60° C., ether, and petroleum ether. The faintly yellow crystalline product weighs 180 parts. Four recrystallizations from aqueous acetone give 1,2,7,8-tetraphenyl-4-octene-3,3,4,5,6,6-hexacarbonitrile in the form of colorless crystals melting at 130–131° C.

*Anal.*—Calcd. for $C_{38}H_{26}N_6$: C, 80.54; H, 4.63; N, 14.83. Found: C, 80.54; H, 4.91; N, 14.61.

*Example XIV*

2,9-DIMETHYL-5-DECENE-4,4,5,6,7,7-HEXACARBONITRILE

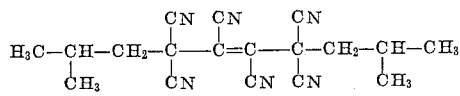

To a mechanically stirred suspension of 45 parts of 52.3% sodium hydride in 444 parts of tetrahydrofuran is added slowly a solution of 125 parts of isobutylmalononitrile in 444 parts of tetrahydrofuran at 0–5° C. under an atmosphere of nitrogen. A completely homogeneous solution of sodium isobutylmalononitrile is obtained shortly after the addition is completed. This solution is added slowly to a mechanically stirred solution of 75 parts of dichlorofumaronitrile in 888 parts of tetrahydrofuran cooled to —60° C. The thick reaction mixture is allowed to warm to room temperature and diluted with about 8000 parts of ice water. The solid material which separates is collected by filtration and washed in turn with water, methanol, and ether to yield 120 parts of nearly colorless, crystalline 2,9-dimethyl-5-decene-4,4,5,6,7,7-hexacarbonitrile. Recrystallization from acetone/water gives colorless crystals, M.P. 222–223° C.

*Anal.*—Calcd. for $C_{18}H_{18}N_6$: C, 67.90; H, 5.70; N, 26.40. Found: C, 68.03; H, 5.74; N, 26.68.

*Example XV*

2,3,8,9-TETRAMETHYL-5-DECENE-4,4,5,6,7,7-HEXACARBONITRILE

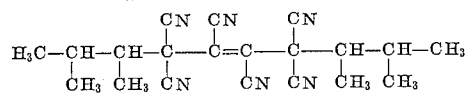

A solution of sodium 1,2-dimethylpropylmalononitrile is prepared essentially as described in the first part of Example II using 370 parts of 1,2-dimethylpropylmalononitrile and 48 parts of sodium hydride in tetrahydrofuran at 0–5° C. This solution is added slowly to a solution of 150 parts of dichlorofumaronitrile in 1332 parts of tetrahydrofuran at —60° C. The thick reaction mixture is allowed to warm to room temperature and diluted with about 7500 parts of ice water. The solid which separates is collected by filtration and washed in turn with water, methanol cooled to —40° C. and ether to yield 300 parts of 2,3,8,9 - tetramethyl - 5-decene-4,4,5,6,7,7-hexacarbonitrile in the form of nearly colorless material, M.P. 189–192° C. A 20-part sample is dissolved in 2338 parts of methylene chloride and the solution is concentrated. A small amount of material separates during the concentration and additional material separates on the addition of ether. The solid is collected and suspended in 668 parts of methylene chloride. The insoluble portion is filtered, and washed with methylene chloride. This fraction melts at 209–210° C. and is designated isomer A. The methylene chloride filtrate is concentrated to a small volume and ether is added. Crystals separate that are collected and washed with ether. These crystals melt a 186–188° C. and are designated isomer B.

*Anal.*—Calcd. for $C_{20}H_{22}N_6$: C, 69.34; H, 6.40; N, 24.26. Isomer A found: C, 69.30; H, 6.39; N, 24.28. Isomer B found: C, 68.99; H, 6.46; N, 24.10.

*Example XVI*

1,4-BIS(CYCLOPENTYL)-2-BUTENE-1,1,2,3,4,4-HEXACARBONITRILE

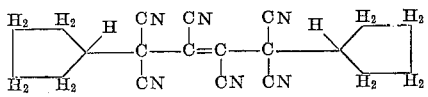

A solution of sodium cyclopentylmalononitrile is prepared essentially as described in the first part of Example II using 270 parts of cyclopentylmalononitrile and 48 parts of sodium hydride in 888 parts of tetrahydrofuran at 0–5° C. This solution is added slowly to a solution of 150 parts of dichlorofumaronitrile in 1332 parts of tetrahydrofuran at —60° C. The resulting deep purple, thick reaction mixture is allowed to warm to 20° C. and diluted with about 7500 parts of ice water. The purple solid which forms is collected by filtration and washed with cold water. The filter cake is washed with methanol until the washings are essentially colorless. After washing with ether, the material is dried under reduced pressure. The material is dissolved is acetone (3 parts per 950 parts), the solution is filtered and concentrated to a small volume during which process colorless crystals separate. The crystalline material is collected, washed with acetone until colorless, then washed with ether to yield 173 parts of 1,4-bis(cyclopentyl) - 2 - butene-1,1,2,3,4,4-hexacarbonitrile, M.P. >275° C. An additional crystallization from acetone does not change the melting point.

*Anal.*—Calcd. for $C_{20}H_{18}N_6$: C, 70.15; H, 5.30; N, 24.55. Found: C, 69.88; H, 5.50; N, 24.59.

*Example XVII*

1,4-BIS(1-METHYLCYCLOPENTYL)-2-BUTENE-1,1,2,3,4,4-HEXACARBONITRILE

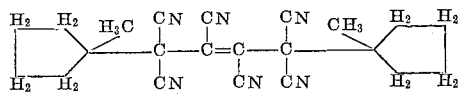

A solution of sodium 1-methylcyclopentylmalononitrile is prepared essentially as described in the first part of Example II using 300 parts of 1-methylcyclopentylmalononitrile and 48 parts of sodium hydride in 1332 parts of tetrahydrofuran at 0–5° C. This solution is added slowly to a solution of 150 parts of dichlorofumaronitrile in 888 parts of tetrahydrofuran at —60° C. The resulting thick, deep violet reaction mixture is allowed to warm to 20° C. and diluted with about 17,000 parts of ice water. The solid which separates is collected and washed in turn with water, methanol, and ether to yield 220 parts of colorless crystals of 1,4-bis(1-methylcyclopentyl)-2-butene-1,1,2,3,4,4-hexacarbonitrile melting at 137–139° C.

*Anal.*—Calcd. for $C_{22}H_{22}N_6$: C, 71.33; H, 5.99; N, 22.69. Found: C, 71.58; H, 6.16; N, 22.70.

*Example XVIII*

1,4-BIS(1-METHYLCYCLOHEXYL)-2-BUTENE-1,1,2,3,4,4-HEXACARBONITRILE

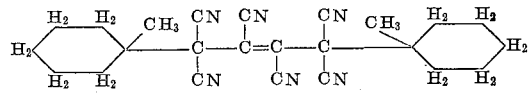

A solution of sodium 1-methylcyclohexylmalononitrile is prepared essentially as described in the first part of Example II using 330 parts of 1-methylcyclohexylmalononitrile and 48 parts of sodium hydride in 1332 parts of tetrahydrofuran at 0–5° C. This solution is added slowly to a solution of 150 parts of dischlorofumaronitrile in 888 parts of tetrahydrofuran at —60° C. The resulting thick, deep purple reaction mixture is diluted with about 17,000 parts of water after warming to 20° C. The solid which separates is collected, washed with water, then with methanol until the washings are colorless and finally with ether. Recrystallization of the crude material (320 parts) from aqueous acetone gives 260 parts of colorless 1,4-bis-(1-methylcyclohexyl)-2-butene-1,1,2,3,4,4-hexacarbonitrile.

*Anal.*—Calcd. for $C_{24}H_{26}N_6$: C, 72,33; H, 6.57; N, 21.09. Found: C, 72.62; H, 6.88; N. 20.94.

Example XIX

1,8-DIPHENYL-4-OCTENE-3,3,4,5,6,6-HEXACARBONITRILE

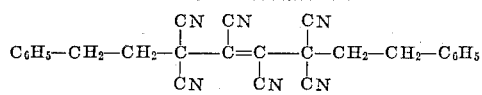

A solution of sodium β-phenylethylmalononitrile is prepared essentially as described in the first part of Example II using 170 parts of β-phenylethylmalononitrile and 24 parts of sodium hydride in 888 parts of tetrahydrofuran at 0–5° C. The resulting solution is added slowly to a solution of 75 parts of dichlorofumaronitrile in 666 parts of tetrahydrofuran at −70° C. During warming to 0° C., the original solid dissolves and a solid precipitates. After diluting with about 800 parts of water, the solid is collected, washed with water, then with methanol until the washings are colorless and finally with ether to yield 200 parts of 1,8-diphenyl-4-octene-3,3,4,5,6,6-hexacarbonitrile, M.P. 270–271° C. Two recrystallizations from actone/water give colorless crystals, M.P. 271–272° C.

*Anal.*—Calcd. for $C_{26}H_{18}N_6$: C, 75.34; H, 4.38; N, 20.28. Found: C, 75.39; H, 4.44; N, 20.39.

Example XX

3,3,8,8-TETRAMETHYL-5-DECENE-4,4,5,6,7,7-HEXACARBONITRILE

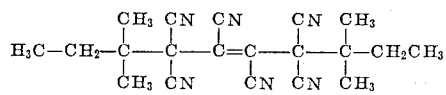

A solution of sodium 1,1-dimethyl-n-propylmalononitrile is prepared in the manner of the first part of Example II using 72 parts of sodium hydride, 410 parts of 1,1-dimethyl-n-propylmalononitrile and 3000 parts of tetrahydrofuran. This solution is added slowly to a solution of 225 parts of dichlorofumaronitrile in 2000 parts of tetrahydrofuran at −70° C. The reaction mixture is allowed to warm to room temperature and is diluted with ice water. The precipitate which forms is separated by filtration and washed in turn with water, methanol at −10° C., ether, and petroleum ether. The nearly colorless product weighs 450 parts. Two crystallizations from aqueous acetone give 3,3,8,8-tetramethyl-5-decene-4,4,5,6,7,7-hexacarbonitrile in the form of colorless crystals melting at 186–187° C.

*Anal.*—Calcd. for $C_{20}H_{22}N_6$: C, 69.34; H, 6.40; N, 24.26. Found: C, 69.37; H, 6.50; N, 24.43.

Example XXI

2,3,3,8,8,9-HEXAMETHYL-5-DECENE-4,4,5,6,7,7-HEXACARBONITRILE

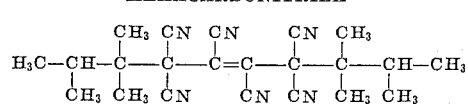

A solution of sodium 1,1,2-trimethyl-n-propylmalononitrile is prepared in the manner of the first part of Example II using 24 parts of sodium hydride, 150 parts of 1,1,2-trimethyl-n-propylmalononitrile, and 1332 parts of tetrahydrofuran. The solution is added slowly to a solution of 71 parts of dichlorofumaronitrile in 666 parts of tetrahydrofuran at −70° C. The reaction mixture is allowed to warm to −20° C. and is diluted with ice water. The precipitate which forms is collected by filtration and washed in turn with water, methanol at −40° C., ether, and petroleum ether. The resulting 2,3,3,8,8,9-hexamethyl-5-decene-4,4,5,6,7,7-hexacarbonitrile is a colorless compound melting at 97–98° C.

Example XXII

1,4-BIS(p-METHOXYPHENYL)-2-BUTENE-1,1,2,3,4,4-HEXACARBONITRILE

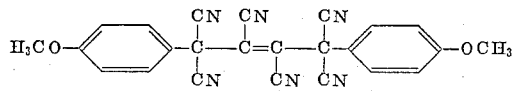

A solution of sodium (p-methoxyphenyl)malononitrile is prepared in the manner of the first part of Example II using 48 parts of sodium hydride, 344 parts of (p-methoxyphenyl)malononitrile and 2664 parts of tetrahydrofuran. This solution is added slowly to 150 parts of dichlorofumaronitrile in 1332 parts of tetrahydrofuran at −70° C. The reaction mixture is allowed to warm to 0° C. and is diluted with ice water. The precipitate which forms is collected by filtration and is washed in turn with water, methanol at −40° C., ether, and petroleum ether. The yellow crystalline product weighs 400 parts. Seven crystallizations from aqueous acetone gave 1,4 - bis(p - methoxyphenyl) - 2 - butene-1,1,2,3,4,4 - hexacarbonitrile in the form of yellow crystals melting at 215–216° C.

*Anal.*—Calcd. for $C_{24}H_{14}O_2N_6$: C, 68.89; H, 3.37; N, 20.09. Found: C, 68.98; H, 3.48; N, 20.08.

Example XXIII

3-HEXENE-2,2,3,4,5,5-HEXACARBONITRILE

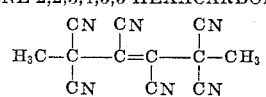

A suspension of sodium methylmalononitrile is prepared in the manner of the first part of Example II using 40 parts of sodium hydride, 160 parts of methylmalononitrile, and 2664 parts of tetrahydrofuran. This suspension is added slowly to a solution of 150 parts of dichlorofumaronitrile in 1332 parts of tetrahydrofuran at −70° C. The reaction mixture is allowed to warm to 15° C. and is diluted with ice water. The precipitate which forms is collected by filtration and washed in turn with water, methanol at −10° C., ether, and petroleum ether. The colorless crystalline product weighs 203 parts. Two crystallizations from acetone give 3-hexene-2,2,3,4,5,5-hexacarbonitrile in the form of colorless crystals melting at 292° C.

*Anal.*—Calcd. for $C_{12}H_6N_6$: C, 61.53; H, 2.58; N, 35.88. Found: C, 61.75; H, 2.54; N, 36.14.

Example XXIV

2,7-BIS(2-FURYL)-4-OCTENE-3,3,4,5,6,6-HEXACARBONITRILE

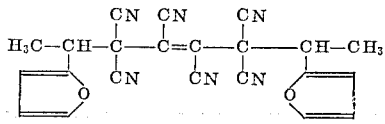

A solution of sodium α-methyl-2-furfurylmalononitrile is prepared in the manner of the first part of Example II using 48 parts of sodium hydride, 320 parts of α-methyl-2-furfurylmalononitrile, and 2664 parts of tetrahydrofuran. This solution is added slowly to a solution of 150 parts of dichlorofumaronitrile in 888 parts of tetrahydrofuran at −70° C. to obtain a solution of 2,7-bis-(2-furyl)-4-octene-3,3,4,5,6,6 - hexacarbonitrile. The 4-octene may be recovered from solution by evaporating the tetrahydrofuran at a temperature below −50° C.

Example XXV

1,4-BIS(2-FURFURYL)-2-BUTENE-1,1,2,3,4,4-HEXACARBONITRILE

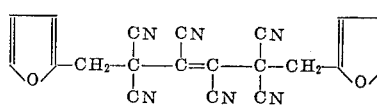

A solution of sodium 2-furfurylmalononitrile is prepared in the manner of the first part of Example II using 48 parts of sodium hydride, 290 parts of 2-furfurylmalononitrile, and 2664 parts of tetrahydrofuran. This solution is added slowly to a solution of 150 parts of dichlorofumaronitrile in 1332 parts of tetrahydrofuran at −70° C. The reaction mixture is allowed to warm to 0° C. and is diluted with ice water. The precipitate which forms is collected by filtration and washed in turn with water, methanol at −20° C., ether, and petroleum ether. The yellow crystalline product weighs 310 parts. Three crystallizations from aqueous acetone give 1,4-bis(2-furfuryl)-2-butene-1,1,2,3,4,4 - hexacarbonitrile in the form of yellow crystals melting at 170–172° C. with decomposition.

*Anal.*—Calcd. for $C_{20}H_{10}O_2N_6$: C, 65.57; H, 2.75; N, 22.94. Found: C, 65.88; H, 2.88; N, 22.77.

Example XXVI 2,7-BIS(p-ISOPROPYLPHENYL)-4-OCTENE-3,3,4,5,6,6-HEXACARBONITRILE

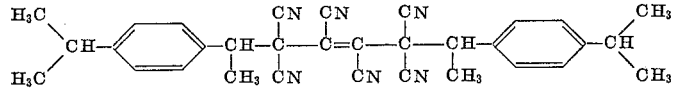

A solution of sodium α-methyl-p-isopropylbenzylmalononitrile is prepared in the manner of the first part of Example II using 48 parts of sodium hydride, 420 parts of α-methyl-p-isopropylbenzylmalonitrile and 2664 parts of tetrahydrofuran. This solution is added slowly to a solution of 150 parts of dichlorofumaronitrile in 1332 parts of tetrahydrofuran at −70° C. The reaction mixture is allowed to warm to −20° C. and is diluted with ice water. The gummy precipitate which forms is collected by filtration and washed with water. The gummy precipitate is stirred with methanol at −10° C. whereupon a light yellow solid is obtained. The solid is collected by filtration, is washed in turn with methanol at −10° C., ether and petroleum ether. The faintly yellow crystalline product weighs 220 parts and melts with decomposition at 140–141° C. Three crystallizations from aqueous acetone give 2,7-bis(p-isopropylphenyl)-4-octene-3,3,4,5,6,6-hexacarbonitrile in the form of colorless crystals melting at 141–142° C. with decomposition.

*Anal.*—Calcd. for $C_{32}H_{30}N_6$: C, 77.09; H, 6.06; N, 16.86. Found: C, 77.20; H, 5.99; N, 16.81.

Example XXVII 1,4-BIS(p-ISOPROPYLBENZYL)-2-BUTENE-1,1,2,3,4,4-HEXACARBONITRILE

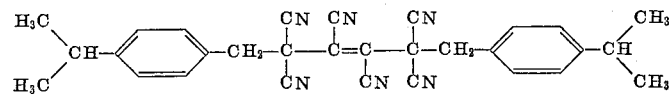

A solution of sodium p-isopropylbenzylmalononitrile prepared in the manner of the first part of Example II using 120 parts of sodium hydride, 100 parts of p-isopropylbenzylmalononitrile and 666 parts of tetrahydrofuran. This solution is added slowly to a solution of 38 parts of dichlorofumaronitrile in 222 parts of tetrahydrofuran at −70° C. The reaction mixture is allowed to warm to 10° C. and is diluted with ice water. The precipitate which forms is collected by filtration and washed in turn with water, methanol at −10° C., ether, and petroleum ether. The colorless crystalline product weights 105 parts. Two crystallizations, first from aqueous acetone and then from ether, give 1,4-bis(p-isopropylbenzyl) - 2 - butene-1,1,2,3,4,4 - hexacarbonitrile in the form of colorless plates melting at 189–190° C.

*Anal.*—Calcd. for $C_{30}H_{26}N_6$: C, 76.57; H, 5.57; N, 17.86. Found: C, 76.99; H, 5.60; N, 17.88.

Example XXVIII 1,4-BIS(p-ISOPROPYLPHENYL)-2-BUTENE-1,1,2,3,4,4-HEXACARBONITRILE

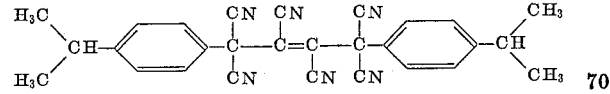

A solution of sodium p-isopropylphenylmalononitrile is prepared in the manner of the first part of Example II using 24 parts of sodium hydride, 184 parts of isopropylphenylmalononitrile, and 1000 parts of tetrahydrofuran. This solution is added slowly to 75 parts of dichlorofumaronitrile in 700 parts of tetrahydrofuran at −70° C. The reaction mixture is warmed to room temperature and is diluted with ice water. The precipitate which forms is collected by filtration and washed in turn with ice water, methanol at −10° C., and ether at −50° C. The essentially colorless product weighs 130 parts and melts at 191–192° C. with decomposition. Crystallization from aqueous acetone followed by crystallization from ether gives 1,4-bis(p-isopropylphenyl)-2-butene-1,1,2,3,4,4-hexacarbonitrile in the form of colorless crystals melting at 192–193° C. with decomposition.

*Anal.*—Calcd. for $C_{28}H_{22}N_6$: C, 75.99; H, 5.01; N, 18.99. Found: C, 75.97; H, 4.98; N, 18.99.

Example XXIX 2,7-BIS(p-METHOXYCARBONYLPHENYL)-4-OCTENE-3,3,4,5,6,6-HEXACARBONITRILE

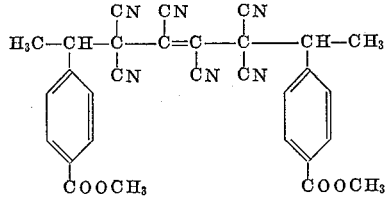

A solution of sodium α-methyl-p-carbomethoxybenzylmalononitrile is prepared in the manner of the first part of Example II using 16 parts of sodium hydride, 150 parts of α-methyl-p-carbomethoxybenzylmalononitrile, and 750 parts of tetrahydrofuran. This solution is added slowly to 49 parts of dichlorofumaronitrile in 500 parts of tetrahydrofuran at −70° C. The reaction mixture is allowed to warm to 0° C. and is diluted with ice water. The gummy precipitate which forms is collected and stirred with cold methanol whereupon a crystalline solid is obtained. The crystalline material is collected by filtration and washed in turn with methanol at −20° C. and ether at −40° C. The nearly colorless product weighs 35 parts and melts at 180–182° C. with decomposition. Two crystallizations from acetone give 2,7-bis(p-methoxycarbonylphenyl)-4-octene - 3,3,4,5,6,6 - hexacarbonitrile in the form of colorless crystals melting at 182–183° C. with decomposition.

*Anal.*—Calcd. for $C_{30}H_{22}O_4N_6$: C, 67.91; H, 4.18; N, 15.84. Found: C, 67.73; H, 4.57; N, 15.62.

Example XXX 2,7-BIS(p-CYANOPHENYL)-4-OCTENE-3,3,4,5,6,6-HEXACARBONITRILE

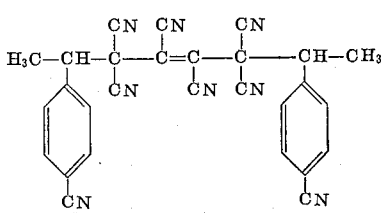

A solution of sodium α-methyl-p-cyanobenzylmalononitrile is prepared in the manner of the first part of Example II using 24 parts of sodium hydride, 195 parts of sodium hydride, 195 parts of α-methyl-β-cyanobenzylmalononitrile, and 1000 parts of tetrahydrofuran. This solution is added slowly to a solution of 75 parts of dichlorofumaronitrile in 700 parts of tetrahydrofuran at −70° C. The reaction mixture is warmed to 10° C. and diluted with ice water. The precipitate which forms is collected by filtration and washed in turn with water, methanol at −10° C., and ether at −20° C. The nearly colorless product weights 180 parts and melts at 198–200° C. with decomposition. The product is a mixture of two isomeric compounds, the meso isomer and the DL isomer. One isomer, probably the meso form, is readily soluble in acetone whereas the second isomer, probably the DL form, is only sparingly soluble in acetone. Crystallization of the isomer sparingly soluble in acetone from aqueous acetone gives 2,7-bis(p-cyanophenyl)-4-octene-3,3,4,5,6,6-hexacarbonitrile, probably the DL isomer, in the form of colorless crystals melting at 207–208° C. with decomposition.

*Anal.*—Calcd. for $C_{28}H_{16}N_8$: C, 72.40; H, 3.47; N, 24.13. Found: C, 72.66; H, 3.66; N, 23.88.

Crystallization of the isomer readily soluble in acetone from aqueous acetone gives 2,7-bis(p-cyanophenyl)-4-octene-3,3,4,5,6,6-hexacarbonitrile, probably the meso isomer, in the form of colorless crystals melting at 195–196° C. with decomposition.

*Anal.*—Calcd. for $C_{28}H_{16}N_8$: C, 72.40; H, 3.47; N, 24.13. Found: C, 72.33; H, 3.86; N, 24.06.

represented by Formula I, yield strong electrolytes on heating. All these products are accordingly useful as the essential ingredient in thermal cells which can be used for operating triggers or switches. The decomposition temperatures of the several compounds in this class cover a wide range, and by suitable selection of the active ingredient, thermal cells to deliver current for switching at a wide variety of temperatures can be prepared. Thermal cells of this type are illustrated as follows:

*Example A*

A copper block 2″ x 3″ x 0.25″ is placed on top of a hot plate which has a controlled variable electrical input. The copper block is electrically insulated from the hot plate by a film of polytetrafluoroethylene. The upper surface of the copper block is polished to provide good electrical contact with a graphite cathode 2″ x 3″ x 0.375″ which is placed on top of the copper block. A thermocouple for observing temperature is inserted in the graphite cathode. Finely powdered 2,7-dibenzyl-2,7-dimethyl-4-octene-3,3,4,5,6,6-hexacarbonitrile (0.2 g., products of Example V) is dispersed on a fiberglass separator about 0.5 mm. thick which is placed on top of the graphite cathode. On top of this separator is placed a magnesium anode 2″ x 3″ x 0.03″, followed in order by an insulating film of polytetrafluoroethylene and a 15-pound steel block to compact the cell. Electrical leads are attached from the copper block and the magnesium anode. The hot plate is heated rapidly until the thermocouple shows a temperature of 155° C., and then heating is continued so that the temperature rises one degree per minute until

*Example XXXI*

1,6-BIS(p-CARBOMETHOXYPHENYL)-3-HEXENE-2,2,3,4,5,5-HEXACARBONITRILE

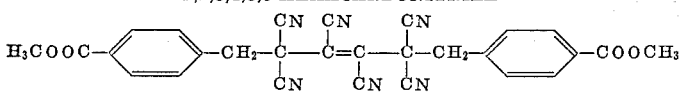

A solution of sodium p-carbomethoxybenzylmalononitrile is prepared in the manner of the first part of Example II using 12 parts of sodium hydride, 107 parts of p-carbomethoxybenzylmalononitrile and 350 parts of tetrahydrofuran. This solution is added slowly to a solution of 38 parts of dichlorofumaronitrile in 400 parts of tetrahydrofuran at −70° C. The reaction mixture is allowed to warm to room temperature and is diluted with ice water. The precipitate which forms is collected by filtration and is washed in turn with ice water, methanol, acetone, ether, and petroleum ether. The yield of nearly colorless product is 114 parts and it does not melt below 275° C.

*Anal.*—Calcd. for $C_{28}H_{18}O_4N_6$: C, 66.92; H, 3.61; N, 16.73. Found: C, 66.74; H, 3.79; N, 16.32.

The process and products of this invention are further illustrated in Table II. The indicated monosubstituted malononitrile is prepared from the indicated known aldehyde or ketone by condensation with malononitrile to obtain an ylidenemalononitrile, which by reaction with hydrogen or a Grignard reagent as in Syntheses A, B, C, or D yields the indicated monosubstituted malononitrile. This in turn is substituted for benzylmalononitrile in the procedure of Example II to obtain the indicated 1,4-disubstituted 2-butenehexacarbonitrile.

The 2-butene-1,1,2,3,4,4-hexacarbonitrile nucleus with the remaining 1,4 positions attached to carbon atoms is the characteristic structure of all the products of this invention and is controlling in selected properties of these compounds regardless of the size or structure of the organic radicals represented by the carbon attachments at the 1,4 positions.

All the compounds of this invention, i.e., all the products a temperature of 165° C., is reached and then is held there. Within 30 seconds after reaching the activation temperature of 165° C., the open-circuit voltage of the cell (measured with the electrical leads connected to a vacuum tube voltmeter of above $10^{-6}$ ohms resistance) is 1.5 volts. The half time of the cell (i.e., the time for the voltage to drop to 0.75 volt) on open circuit is 40 minutes. On discharge of the cell through a lower resistance with a current drain of $2.0 \times 10^{-6}$ amperes at 1.0 volt, the half time (i.e., the time for voltage to drop to 0.5 volt) is eight minutes. Discharge current of this magnitude is useful for operating triggers, circuit breakers, and the like.

*Example B*

A cell like that in Example A is assembled, with the exception that 0.2 g. of 1,2,7,8-tetraphenyl-4-octene-3,3,4,5,6,6-hexacarbonitrile (product of Example XIII) is used in place of 2,7-dibenzyl-2,7-dimethyl-4-octene-3,3,4,5,6,6-hexacarbonitrile. The cell is heated rapidly to about 120° C. and then warmed at one degree per minute until a temperature of 127° C. is reached and then is held there. Within 30 seconds after reaching this activation temperature of 127° C., the open-circuit voltage is 2.3 volts, and the half time (i.e., for drop to 1.15 volts) on open circuit is 150 minutes. On discharge at a current drain of $4.0 \times 10^{-6}$ amperes at 0.8 volt, the half time (i.e., for drop to 0.4 volt) is 14 minutes. Discharge current of this magnitude is useful for operating triggers, circuit breakers, and the like.

The foregoing detailed description has been given for clearness of understanding only and no unnecessary limitations are to be understood thereform. The invention is not limited to the exact details shown and described for obvious modifications will occur to those skilled in the art.

TABLE II

| Carbonyl compound condensed with malononitrile | Agent reacted with resulting ylidene-malononitrile* | Monosubstituted malononitrile | 1,4-disubstituted 2-butenehexacarbonitrile from reaction with dichlorofumaronitrile |
|---|---|---|---|
| Stearaldehyde | Hydrogen | Stearylmalononitrile | 1,4-distearyl-2-butenehexacarbonitrile. |
| α-Naphthaldehyde | Benzylmagnesium bromide. | α-Naphthyl-β-phenylethylmalononitrile. | 1,4-bis(α-naphthyl-β-phenylethyl)-2-butenehexacarbonitrile. |
| 9-anthraldehyde | Methylmagnesium bromide. | α-(9-anthryl)ethylmalononitrile | 1,4-bis[α-(9-anthryl)ethyl]-2-butenehexacarbonitrile. |
| Benzo[a]pyrene-5-aldehyde | do | α-(5-benzo[a]pyrenyl)ethylmalononitrile. | 1,4-bis[α-(5-benzo-[a]pyrenyl)ethyl]-2-butenehexacarbonitrile. |
| 2,4,6-octatrienal | Benzylmagnesium bromide. | 1-benzyl-2,4,6-octatrienylmalononitrile. | 1,4-bis(1-benzyl-2,4,6-octatrienyl)-2-butenehexacarbonitrile. |
| Propargyl aldehyde | Methylmagnesium bromide. | 1-methyl-2-propynylmalononitrile | 1,4-bis(1-methyl-2-propynyl)-2-butenehexacarbonitrile. |
| 2-heptynal | do | 1-methyl-2-heptynylmalononitrile | 1,4-bis(1-methyl-2-heptynyl)-2-butenehexacarbonitrile. |
| Trifluoroacetaldehyde | Benzylmagnesium bromide. | 2-phenyl-1-trifluoromethylethyl-malononitrile. | 1,4-bis(2-phenyl-1-trifluoromethylethyl)-2-butenehexacarbonitrile. |
| Tribromoacetaldehyde | Methylmagnesium bromide. | 1-methyl-2,2,2-trifluoroethylmalononitrile. | 1,4-bis(1-methyl-2,2,2-trifluoroethyl)-2-butenehexacarbonitrile. |
| p-Iodobenzaldehyde | do | α-Methyl-p-iodobenzylmalononitrile | 1,4-bis(α-methyl-p-iodobenzyl)-2-butenehexacarbonitrile. |
| 5-Hydroxypentanal | Hydrogen | 5-hydroxypentylmalononitrile | 1,4-bis(5-hydroxypentyl)-2-butenehexacarbonitrile. |
| Glyceraldehyde | Benzylmagnesium bromide. | 1-benzyl-2,3-dihydroxypropylmalononitrile. | 1,4-bis(1-benzyl-2,3-dihydroxypropyl)-2-butenehexacarbonitrile. |
| Salicylaldehyde | Methylmagnesium bromide. | o-Hydroxy-α-methylbenzylmalononitrile. | 1,4-bis(o-hydroxy-α-methylbenzyl)-2-butenehexacarbonitrile. |
| 1-naphthol-2-aldehyde | Ethylmagnesium bromide. | 1-(1-hydroxy-2-naphthyl)propyl-malononitrile. | 1,4-bis[1-(1-hydroxy-2-naphthyl)propyl]-2-butenehexacarbonitrile. |
| Methoxyacetaldehyde | Benzylmagnesium bromide. | 1-benzyl-2-methoxyethylmalononitrile. | 1,4-bis(1-benzyl-2-methoxyethyl)-2-butenehexacarbonitrile. |
| 2-methyl-2,3-dimethoxypentanal | Methylmagnesium bromide. | 2,3-dimethoxy-1,2-dimethylpentyl-malononitrile. | 1,4-bis(2,3-dimethoxy-1,2-dimethylpenty)-2-butenehexacarbonitrile. |
| o-Phenoxybenzaldehyde | do | o-Phenoxy-α-methylbenzylmalononitrile. | 1,4-bis(o-phenoxy-α-methylbenzyl)-2-butenehexacarbonitrile. |
| m-Benzyloxybenzaldehyde | do | m-Benzyloxy-α-methylbenzylmalononitrile. | 1,4-bis(m-benzyloxy-α-methylbenzyl)-2-butenehexacarbonitrile. |
| Di-n-heptadecyl ketone | Hydrogen | 1-heptadecyloctadecylmalononitrile | 1,4-bis(1-heptadecyloctadecyl)-2-butenehexacarbonitrile. |
| S-tetralone | do | 1,2,3,4-tetrahydro-2-napthylmalononitrile. | 1,4-bis(1,2,3,4-tetrahydro-2-napthyl)-2-butenehexacarbonitrile. |
| Benzophenone | Methlmagnesium bromide. | 1,1-diphenylethylmalononitrile | 1,4-bis(1,1-diphenylethyl)-2-butanehexacarbonitrile. |
| 2-methyl-2-,5-hetpadiene-4-one | do | 1-isobutenyl-1-propenylethylmalononitrile. | 1,4-bis(1-isobutenyl-1-propenylethyl)-2-butenehexacarbonitrile. |
| 2-cyclohexeneone | Hydrogen | 2-cyclohexenylmalononitrile | 1,4-bis(2-cyclohexenyl)-2-butenehexacarbonitrile. |
| p-Iodoacetophenone | do | 1-(p-iodophenyl)ethylmalononitrile | 1,4-bis[1-(p-iodophenyl)ethyl]-2-butenehexacarbonitrile. |
| α-Chloro-α-phenylacetone | Phenylmagnesium bromide. | 1-chloro-1,2-diphenyl-2-propylmalononitrile. | 1,4-bis(1-chloro-1,2-diphenyl-2-propyl)-2-butenehexacarbonitrile. |
| 1,1,1-tris(β-cyanoethyl)acetone | Hydrogen | 1,1,1-tris(β-cyanoethyl)-2-propylmalononitrile. | 1,4-bis[1,1,1-tris(β-cyanoethyl)-2-propyl]-2-butenehexacarbonitrile. |
| 2-cyanocyclohexanone | do | 2-cyanocyclohexylmalononitrile | 1,4-bis(2-cyanocyclohexyl)-2-butenehexacarbonitrile. |
| 4,4'-dicyanobenzophenone | Methylmagnesium bromide. | 1,1-di(p-cyanophenyl)ethylmalononitrile. | 1,4-bis[1,1-di(p-cyanophenyl)ethyl]-2-butenehexacarbonitrile. |
| 4,4-dimethyl-5-nitro-2-pentanone | Hydrogen | 4-nitro-1,3,3-trimethylbutylmalononitrile. | 1,4-bis(4-nitro-1,3,3-trimethylbutyl)-2-butenehexacarbonitrile. |
| 2,4-dinitrobenzaldehyde | Methylmagesium bromide. | 1-(2,4-dinitrophenyl)ethylmalononitrile. | 1,4-bis[1-(2,4-dinitrophenyl)ethyl]-2-butenehexacarbonitrile. |
| Sodium salt of acetophenone-ω-sulfonic acid. | Hydrogen | 1-(p-sodiooxysulfonylphenyl)ethylmalononitrile. | 1,4-bis[1-(p-sodiooxysulfonylphenyl)ethyl]-2-butenehexacarbonitrile. |
| Methyl ester of acetophenone-ω-sulfonic acid. | do | 1-(p-methoxysulfonylphenyl)ethylmalononitrile. | 1,4-bis[1-(p-methoxysulfonylphenyl)ethyl]-2-butenehexacarbonitrile. |
| γ,γ-dicarbethoxybutyraldehyde | do | 3,3-di(ethoxycarbonyl)butylmalononitrile. | 1,4-bis[3,3-di(ethoxycarbonyl)butyl]-2-butenehexacarbonitrile. |
| 2-ethoxycarbonylcyclopentanone | do | 2-ethoxycarbonylcylopentylmalononitrile. | 1,4-bis[2-ethoxycarbonylcyclopentyl]-2-butenehexacarbonitrile. |
| Ethyl-p-acetylbenzoate | do | 1-(p-ethoxycarbonylphenyl)ethylmalononitrile. | 1,4-bis[1-(p-ethoxycarbonylphenyl)ethyl]-2-butenehexacarbonitrile. |
| 5-methyl-2-furaldehyde | Methylmagnesium bromide. | 1-(5-methyl-2-furyl)ethylmalononitrile. | 1,4-bis[1-(5-methyl-2-furyl)ethyl]-2-butenehexacarbonitrile. |
| 2-formylthiophene | do | α-Methyl-2-thenylmalononitrile | 1,4-bis[α-methyl-2-thenyl]-2-butenehexacarbonitrile. |
| 2-formylpyridine | do | 1-(2-pyridyl)ethylmalononitrile | 1,4-bis[1-(2-pyridyl)ethyl]-2-butenehexacarbonitrile. |
| 5-formyl-2-methoxycarbonyl-3-methylbenzofuran. | do | 1-(2-methoxycarbonyl-3-methylbenzofuran-5-yl)ethylmalononitrile. | 1,4-bis[1-(2-methoxycarbonyl-3-methylbenzofuran-5-yl)ethyl]-2-butenehexacarbonitrile. |
| 5-methoxycarbonyl-2-furaldehyde | Benzylmagnesium bromide. | 1-(5-methoxycarbonyl-2-furyl)-2-phenylethylmalononitrile. | 1,4-bis[1-(5-methoxycarbonyl-2-furyl)-2-phenylethyl]-2-butenehexacarbonitrile. |
| 2-methoxycarbonyl-7(6)-formyl-1-methyl-naphtho[2,1-b]furan. | Methylmagnesium bromide. | 1-(2-methoxycarbonyl-1-methylnaphtho[2,1-b]furan-7(6)-yl)ethylmalononitrile. | 1,4-bis[1-(2-methoxycarbonyl-1-methylnaphtho-[2,1-b]furan-7(6)-yl)ethyl]-2-butenehexacarbonitrile. |
| 2-methoxycarbonyl-5-formyl-3-methyl-1-benzothiophene. | do | 1-(2-methoxycarbonyl-3-methyl-1-benzothien-5-yl)ethylmalononitrile. | 1,4-bis[1-(2-methoxycarbonyl-3-methyl-1-benzothien-5-yl)ethyl]-2-butenehexacarbonitrile. |
| p-Cyanoacetylphenoxyacetaldehyde | Hydrogen | 2-(p-cyanoacetylphenoxy)ethylmalononitrile. | 1,4-bis[2-(p-cyanoacetylphenoxy)ethyl]-2-butenehexacarbonitrile. |
| m-[3-(4-cyanoacetylphenyl)ureido]-benzaldehyde. | Methylmagnesium bromide. | 1-[m-(3-[4-cyoanacetylphenyl]ureido)phenyl]-ethylmalononitrile. | 1,4-bis[1-(m-[3-(4-cyanoacetylphenyl)ureido)phenyl]ethyl]-2-butenehexacarbonitrile. |
| m-(p-cyanoacetylbenzamido)benz-aldehyde. | do | 1-[m-(p-cyanoacetylbenzamido)phenyl]ethylmalononitrile. | 1,4-bis[1-(m-[p-cyanoacetylbenzamido]phenyl)-ethyl]-2-butenehexacarbonitrile. |
| Indole-3-aldehyde | do | 1-(3-indolyl)ethylmalononitrile | 1,4-bis[1-(3-indolyl)ethyl]-2-butenehexacarbonitrile. |
| 7-formyl-2-methoxycarbonylanthracene. | do | 1-(2-methoxycarbonyl-7-anthryl)ethylmalononitrile. | 1,4-bis[1-(2-methoxycarbonyl-7-anthryl)ethyl]-2-butenehexacarbonitrile. |
| p-(3-methoxycarbonylpyrazolyl)benzyldehyde. | do | 1-(p-[3-methoxycarbonylpyrazolyl]phenyl)-ethylmalononitrile. | 1,4-bis[1-(p-[3-methoxycarbonylpyrazolyl]phenyl)ethyl]-2-butenehexacarbonitrile. |
| 5-formyl-2-methoxycarbonylbenzothiazole. | do | 1-(2-methoxycarbonyl-5-benzothiazyl)-ethylmalononitrile. | 1,4-bis[1-(2-methoxycarbonyl-5-benzothiazyl)ethyl]-2-butenehexacarbonitrile. |

* Other derivatives are readily prepared from each of the carbonyl compounds shown in the first column by treating the ylidenemalononitrile with any of the known Grignard reagents.

The embodiments of the invention in which an exclusive property or privilege is claimed are defined as follows:

1. 1,4-Disubstituted 2-butenehexacarbonitriles of the formula

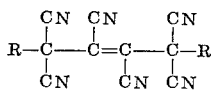

wherein R is selected from the group consisting of hydrocarbyl and substituted hydrocarbyl wherein the substituents are selected from the group consisting of amino diloweralkylamino hydroxy, cyano, halo, nitro, sulfo, loweralkylsulfonyl loweralkoxy benzyloxy, aryloxy loweralkoxycarbonyl.

2. 1,4 - diphenyl - 2 - butene - 1,1,2,3,4,4 - hexacarbonitrile.

3. 1,6 - diphenyl - 3 - hexene - 2,2,3,4,5,5 - hexacarbonitrile.

4. 2,7 - diphenyl - 4 - octene - 3,3,4,5,6,6 - hexacarbonitrile.

5. 2,7 - dimethyl - 2,7 - diphenyl - 4 - octene-3,3,4,5,6,6-hexacarbonitrile.

6. 2,7 - dibenzyl - 2,7 - dimethyl-4-octene-3,3,4,5,6,6,-hexacarbonitrile.

7. A process for the preparation of 1,4-disubstituted 2-butenehexacarbonitriles which comprises contacting a compound of the formula

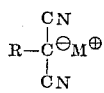

wherein R is selected from the group consisting of hydrocarbyl and substituted hydrocarbyl wherein the substituents are selected from the group consisting of amino diloweralkylamino, hydroxy, cyano, halo, nitro, sulfo, loweralkylsulfonyl, loweralkoxy, benzyloxy, aryloxy loweralkoxycarbonyl and M is a cation selected from the group consisting of alkali metals and alkaline earth metals, with a 1,2-dihalo-1,2-dicyanoethylene wherein the halo is selected from the class consisting of chloro, bromo, and iodo, at a temperature range of from $-100°$ C. to $+100°$ C.

8. Process of claim 7 wherein the temperature range is from $-80°$ C. to $0.°$ C.

9. Process of claim 7 wherein the reaction is carried out in a liquid solvent medium inert to the reactants and products.

10. Process of claim 7 wherein the 1,2-dihalo-1,2-dicyanoethylene is dichlorofumaronitrile.

11. Process of claim 7 wherein M is sodium and the halo of the 1,2-dihalo-1,2-dicyanoethylene is chlorine.

References Cited in the file of this patent

UNITED STATES PATENTS 2,766,243     Middleton     Oct. 9, 1955

OTHER REFERENCES

Gilman et al.: Organic Syntheses, 1941, Collective vol. I, Second edition, pps. 46–7.

UNITED STATES PATENT OFFICE
CERTIFICATE OF CORRECTION

Patent No. 3,144,477                      August 11, 1964

Elmore L. Martin

It is hereby certified that error appears in the above numbered patent requiring correction and that the said Letters Patent should read as corrected below.

Column 19, lines 18 and 19, after "diloweralkylamino" insert a comma; lines 19 and 20, after "loweralkylsulfonyl" insert a comma; line 20, after "loweralkoxy" insert a comma; same line 20, after "aryloxy" insert -- , and --; column 20, line 9, after "amino" insert a comma; line 11, after "aryloxy" insert -- , and --.

Signed and sealed this 5th day of January 1965.

(SEAL)
Attest:

ERNEST W. SWIDER
Attesting Officer

EDWARD J. BRENNER
Commissioner of Patents